Aug. 24, 1965 R. V. GARVER ETAL 3,202,942

MICROWAVE POWER AMPLITUDE LIMITER

Filed Feb. 28, 1962

INVENTORS,
ROBERT V. GARVER
DAVID Y. TSENG

BY S. J. Rotondi, A. J. Dupont &
J. D. Edgerton
ATTORNEYS

United States Patent Office 3,202,942
Patented Aug. 24, 1965

3,202,942

MICROWAVE POWER AMPLITUDE LIMITER

Robert V. Garver, Rockville, Md., and David Y. Tseng, Washington, D.C., assignors to the United States of America as represented by the Secretary of the Army
Filed Feb. 28, 1962, Ser. No. 176,460
8 Claims. (Cl. 333—9)
(Granted under Title 35, U.S. Code (1952), sec. 266)

The invention described herein may be manufactured and used by or for the Government of the United States of America for governmental purposes without the payment to us of any royalty thereon.

The present invention relates to the field of microwave limiting, and more particularly to the field of X-band diode power limiters of a passive nature.

In microwave systems employing frequency modulation it is often of considerable importance that any accompanying amplitude modulation be kept as low as possible. This is particularly true in FM radio altimeter and FM radar systems where there is close coupling between the transmitting and receiving antennas. The A-M in such systems is usually the factor which limits system performance.

Another application where limiting of a microwave signal is important is in the regulation of the amplitude of a microwave local oscillator signal, such as is used in a superheterodyne microwave receiving system. It is well known that variations in the amplitude of the microwave local oscillator signal have the undesirable effect of shifting the operating point of the crystal mixer where the received and local oscillator signals are conventionally fed.

A further application where limiting is important is in microwave testing equipment. In such equipment a microwave test signal may be adapted to be frequency modulated over wide ranges. It is desirable that the amplitude modulation which inherently accompanies conventional frequency modulated microwave oscillators be reduced to negligible proportions so that it will not interfere with measurements being made using the test signal.

Accordingly it is an object of this invention to provide improved means for limiting power output of a microwave system for varying levels of power input.

It is a further object of this invention to provide a microwave power limiter of a passive nature.

Briefly, this invention involves a utilization of the nonlinear forward impedance characteristic of a diode in a waveguide in order to produce a power limiting operation. A diode is inserted in a waveguide in a passive circuit configuration—i.e., no external biasing of any sort is utilized—and the waveguide is terminated at one end by its characteristic impedance so that there is no reflection of the portion of the energy transmitted past the diode. With such an arrangement, a wave having a relatively constant power level is reflected at the diode for waves having a wide range of power levels which are inserted at the open end of the waveguide.

Figure 1A:
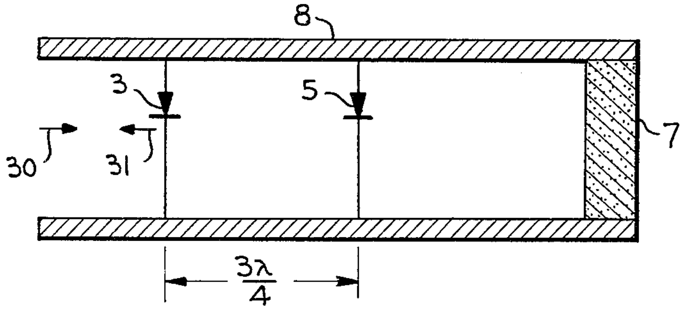
FIG. 1A is a block and schematic diagram of a power limiting element constructed according to the present invention.

Referring now to FIG. 1A there is shown a cross section of a waveguide 8 which is terminated by its characteristic impedance 7. Connected in parallel across the waveguide is a diode 3. The diode used in this embodiment is of the point contact germanium type such as the 1N263 type, which has been successfully used in experimental models of this invention. In order to improve the leveling operation of this device, a tuner is inserted in the waveguide beyond the limiting diode 3. This tuner may be of any well known type adapted to compensate for reactances in the limiter diode. A better limiting action is obtained by using, instead of a fixed tuner, a power sensitive tuner behind the diode. A second diode 5 identical to the power limiting diode 3 and inserted in parallel connection in the waveguide has been found to be a very effective power sensitive tuner when placed ¼, ¾ or any other odd multiple of ¼ of a wavelength behind the limiting diode 3.

Figure 1B:
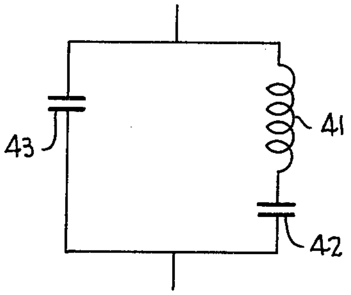
FIG. 1B is an equivalent circuit diagram of the limiting diode.

FIG. 1B is an equivalent circuit representation of the limiting diode 3. The inductance of the diode at the frequencies used in waveguides is represented by the element 41, the distributed capacitance across the diode is represented by the capacitor 43, and the capacitance present at the diode junction at low signal levels is represented by the element 42. The significance of these equivalent circuit parameters will be discussed in connection with the description of the operation of this device, infra.

Figures 2, 3:
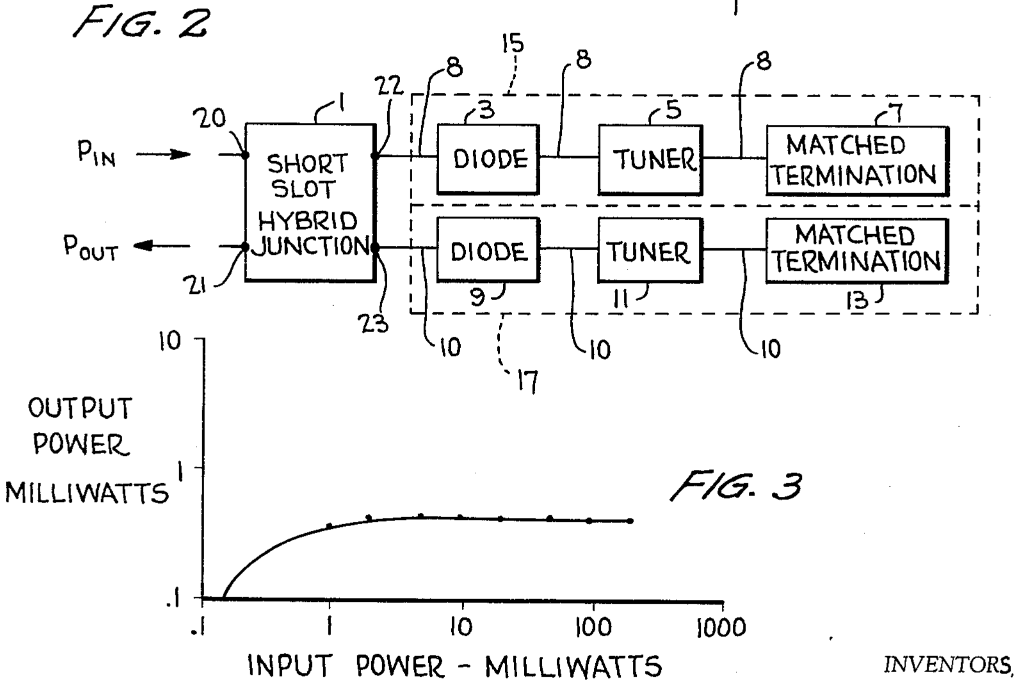
FIG. 2 is a block diagram of a complete power limiter circuit comprising the device of FIG. 1.
FIG. 3 is a graph showing the relation between input power and output power for the structure of FIG. 2.

In order to make use of the limiting ability of the structure of FIG. 1A, it is necessary to have some type of switching circuit which is capable of isolating the signal inserted into the limiter from the signal reflected out. An arrangement meeting these requirements is shown in FIG. 2 wherein a short slot hybrid junction is used in connection with an input terminal 20, an output terminal 21, and two reflector terminals 22 and 23. This junction is a commercially available structure whose properties are such that the phases of the reflected waves at the terminals 22 and 23 add at the output arm 21 and cancel at the input arm 20; thus all power reflected from the diodes 3 and 9 comes out the output 21, and the input arm 20 always appears matched. Such a structure is disclosed in U.S. Patent No. 2,739,288. Since the input power at 20 divides evenly, two identical limiters 15 and 17 are needed.

FIG. 3 is an experimentally derived graph showing the extremely flat limiting obtained over a wide range of inputs for the structure of FIG. 2. The operation of applicants' invention will be explained with reference to FIGS. 1A, 1B and 2. Turning now to FIG. 1A, it will be assumed that incoming waves pass from left to right and reflected waves pass from right to left. When an electromagnetic wave is moving down the waveguide 8 in the direction indicated by the arrow 30, the first discontinuity which it encounters is the diode 3. When this diode has a finite impedance which differs from the waveguide impedance reflections will occur at the diode 3, causing a wave to travel back in the direction of arrow 31 toward the open end of the waveguide (see for example Terman, Electronic and Radio Engineering, McGraw-Hill (1955), page 147). The amount of energy reflected will depend on the relation between diode impedance and waveguide impedance. It has been found experimentally that the diode behaves in such a manner that the diode's junction appears to be ¼ of a wavelength away from the diode itself; i.e., for high junction impedance the diode appears to be a short circuit and for lower junction impedance the diode appears to have a high impedance. This behavior of a diode is due to the presence of distributed inductance and capacitance in the diode at the frequencies at which this circuit operates (around 9,000 megacycles), and will be explained qualitatively with reference to the equivalent circuit of the diode for this frequency which is found in FIG. 1B. The inductance 41 represents the inductance of the diode whisker, the capacitor 43 represents the capacitance across the end caps of the diode, and the capacitance 42 represents the depletion layer capacitance of the diode junction at a time when the diode is in its non-conduction state. This non-conduction state occurs when the diode is at zero or extremely low positive voltage. When the diode junction is at this low voltage, it may be seen that there is an approximate series resonant circuit comprising elements 41 and 42, which constitutes a low impedance across the diode. When the diode junction is in the conduction state, the depletion layer capacitor 42 effectively disappears, and a resistance (not shown) replaces it. This resistance, following the characteristic of all diodes, constantly decreases for increasing voltages. When there is a resistance in the circuit of FIG. 1B in place of the element 42, the equivalent circuit approximates a parallel resonant circuit, such an arrangement having a high impedance.

When an incident wave travels down the waveguide 8 in the direction of the arrow 30, it impinges on the diode 3. At the diode a portion of the wave is reflected back in the direction of arrow 31 while the remainder of the wave continues down the waveguide. Assuming for the purposes of the present discussion that tuning diode 5 is not in the circuit, the wave traveling beyond diode 3 reaches the termination 7, which has an impedance equal to the characteristic impedance of the waveguide 8. Therefore, the wave is completely absorbed by the impedance 7 and no reflections therefrom occur. The fraction of incident voltage reflected at the diode 3 is determined by the well-known relation $$\Gamma=\frac{Z_L-Z_o}{Z_L+Z_o}=\frac{Y_L-Y_o}{Y_L+Y_o} \qquad (1)$$

where Γ represents the fraction of incident voltage reflected at the diode, $Z_L$ and $Y_L$ represent the effective impedance and admittance, respectively, at the waveguide termination, and $Z_o$ and $Y_o$ represent the characteristic impedance and admittance, respectively, of the waveguide. Since the characteristic impedance termination 7 prevents any reflections from occurring in the waveguide beyond diode 3 (when diode 5 is not in the waveguide) the characteristic impedance termination 7 may be considered to be at any location along the waveguide, such as at a position directly behind diode 3. The impedance at the termination may then be considered to be equivalent to a parallel connection of the diode impedance and the characteristic terminating impedance. This parallel impedance is represented by the relation $$Z_L=\frac{Z_d\times Z_o}{Z_d+Z_o} \qquad (2)$$

where $Z_d$ represents the diode impedance (not to be confused with the diode junction impedance). Substituting Equation 2 into Equation 1, the expression for the reflection coefficient Γ at the diode becomes $$\Gamma=\frac{1}{2\frac{Z_d}{Z_o}+1} \qquad (3)$$

From this equation it may be seen that the reflection coefficient at the diode decreases for increasing values of diode impedance.

As was shown, supra, the diode impedance increases for increasing values of incident voltage. Therefore, the fraction of voltage, and power (since power is proportional to $V^2$) reflection decreases for increasing incident voltages, resulting in a compression, or limiting, effect between the incident wave and the reflected wave.

Although the reflector containing one diode operates properly, it has been found that diode reactance adversely effects the ability of the device to provide a flat limiting action. In order to overcome this difficulty, it is necessary to provide some means behind the diode to effectively tune out the undesired reactance component. This may be done by means of a fixed tuner placed some convenient distance behind the diode and adjusted until the proper relation is achieved.

However, the diode reactance is not constant over the power range of the device, so that a fixed tuner will only be completely effective for one power level. Therefore, it is desirable to use a tuner which is capable of varying in the same manner as does the diode reactance. It has been found that the desired compensation is obtained by using a second diode, identical to said first diode, as a power sensitive tuner. When this second diode is placed behind the first diode at a separation of approximately ¼ of a wavelength of the incident wave, the reactance of the first diode is effectively cancelled out over the high power range of the device.

At low power levels, the susceptance of the first diode does not have sufficient effect on its reflection properties to necessitate any tuning correction. Therefore, it is only necessary that the tuner be effective at high power levels. At these high levels the diodes have a high impedance, or a low admittance, as has been noted above. Therefore, the normalized admittance of the parallel combination of the tuning diode and the characteristic terminating admittance is given by the expression $$\frac{Y}{Y_o}=1+j\frac{B}{Y_o}$$

where the real term on the right-hand side of the equation represents the sum of the normalized admittance of the termination, which is 1, and the admittance of the diode, which is very small compared to the characteristic admittance of the waveguide. B represents the susceptance of the tuning diode and has been experimentally determined to be of the order of $.2Y_o$ for high power levels. It has been shown at page 220 of Southworth, Principles and Applications of Waveguide Transmission, Van Norstand Co. (1950), that in order to match out the susceptance represented by B in the above noted expression, it is only necessary to place an equal shunt admittance at a distance $l$ toward the generator measured from the first susceptance, equal to:

$$l=\frac{\lambda_g}{2\pi}\tan^{-1}\left(\frac{2}{B/Y_o}\right)$$

where $\lambda_g$ is the wavelength of the wave in the guide. Since $B/Y_o$ is small, $$\tan^{-1}\left(\frac{2}{B/Y_o}\right)$$

is very nearly equal to $\pi/2$, so that $l$ is approximately equal to $$\frac{\lambda_g}{2\pi}\times\frac{\pi}{2}=\frac{\lambda_g}{4}$$

Thus it may be seen that over the range of relatively small diode susceptances encountered, the spacing of the two diodes ¼ of a wavelength apart produces a fairly accurate susceptance elimination.

The above-described cancellation of reactance may be achieved with the second diode placed at any odd multiple of ¼ of a wavelength from the first diode; however, the nearer the diodes are to each other the wider is the effective bandwidth of the device. This dependence of bandwidth on diode separation is due to the fact that for a given frequency deviation from the center frequency of the device, the amount by which the deviating wave shifts in phase between the diodes is directly proportional to the spacing between these diodes. Therefore, it is usually desirable to have the diodes ¼ of a wavelength apart. In the construction of an experimental model the dimensions of existing diode mounts made it easier to space the diodes ¾ of a wavelength apart, but it is more desirable for reasons given above to space the diodes ¼ of a wavelength apart.

With two diodes in the waveguide, the power limiting function of the device is unimpaired. This fact is demonstrated by the following analysis: Assuming that the terminating impedance of the waveguide is adjacent to the second diode, the effective normalized admittance at the second diode is equal to the normalized admittance of the second diode plus the normalized admittance of the termination, expressed as $$1+\frac{Y_d}{Y_o} \tag{4}$$

In order to determine the total effective admittance at the first diode, it is necessary to first find the effect at the first diode of the parallel admittances of Equation 4. Since the two diodes are spaced an odd multiple of ¼ wavelength apart, the admittance represented by Equation 4 is merely inverted in order to find its effect at the first diode. This is equivalent to rotation of ¼ wavelength on the Smith chart. The effective admittance of Equation 4 at the first diode is then represented by the relation $$\frac{1}{1+\frac{Y_d}{Y_o}} \tag{5}$$

For high values of incident power the impedances of the diode junctions is low making the impedances across the diode terminals high, so that the admittances across the diode terminals are low. Therefore, for high values of incident power the fraction $$\left(\frac{Y_d}{Y_o}\right)$$

is less than 1. When this is true, the expression of Equation 5 can be represented by the binominal expansion $$1-\left(\frac{Y_d}{Y_o}\right)+\left(\frac{Y_d}{Y_o}\right)^2-\left(\frac{Y_d}{Y_o}\right)^3+\cdots \tag{6}$$

This admittance is then added to the normalized admittance of the first diode, and all terms higher than the second power are eliminated since, when $Y_d/Y_o$ is less than 1 the higher power terms are negligible, giving the relation $$\frac{Y_L}{Y_o}\approx 1+\left(\frac{Y_d}{Y_o}\right)^2 \tag{7}$$

Substituting this value of admittance into the reflection coefficient equation is $$\Gamma=\frac{1+\left(\frac{Y_d}{Y_o}\right)^2-1}{1+\left(\frac{Y_d}{Y_o}\right)^2+1}=\frac{\left(\frac{Y_d^2}{Y_o}\right)}{2+\left(\frac{Y_d}{Y_o}\right)^2}\approx\frac{1}{2}\left(\frac{Y_d}{Y_o}\right)^2 \tag{8}$$

which is small when the fraction $Y_d/Y_o$ is less than 1.

When the incident power is low, the junction impedance of the diode is high, causing the impedance across the diode to be small. Therefore, the admittance across the diode is high. When $Y_d/Y_o$ is much greater than 1, Equation 5 can be represented by the approximation:

$$\frac{1}{1+\left(\frac{Y_d}{Y_o}\right)}\approx\frac{Y_o}{Y_d} \tag{9}$$

Adding this value of admittance to the normalized admittance of the first diode gives $$\frac{Y_L}{Y_o}=\frac{Y_o}{Y_d}+\frac{Y_d}{Y_o}\approx\frac{Y_d}{Y_o}\text{ for }\frac{Y_d}{Y_o}\gg 1 \tag{10}$$

Substituting this value into the reflection coefficient equation gives $$\Gamma=\frac{\frac{Y_d}{Y_o}-1}{\frac{Y_d}{Y_o}+1}\approx\frac{\frac{Y_d}{Y_o}}{\frac{Y_d}{Y_o}}=1 \tag{11}$$

Thus it may be seen that as incident power goes from a low value to a high value, the reflection coefficient for the two-diode configuration decreases, resulting in the desired limiting action.

In order to be able to properly use the limiting reflector of the present invention, some means must be provided for isolating the input signal and the reflected output signal. There are several known types of such means presently on the market which would provide the desired isolation. One such isolating means is the short slot hybrid junction, which is represented in block form in FIG. 2. This junction has the characteristic of conducting a signal from any one terminal to the two terminals on the opposite side thereof. The signal is divided into equal amplitudes between the two latter terminals, but the signal conducted diagonally across the junction is delayed in phase by 90 degrees from the signal conducted directly across the junction. For example, when a signal is inserted at terminal 20 it is divided evenly between terminals 22 and 23, with the signal appearing at terminal 23 lagging the signal appearing at terminal 22 by 90 degrees. Terminals 22 and 23 are connected to limiting reflectors 15 and 17, respectively. Each of these reflectors is identical to the structure shown in FIG. 1. The signals appearing at terminals 22 and 23 are each conducted down the waveguides 8 and 10, and identical portion of these waves are reflected back to terminals 22 and 23. The reflected wave entering the junction at terminal 22 is divided evenly between terminals 20 and 21, as is the reflected wave entering at terminal 23. Since the reflected waves appearing at terminals 22 and 23 went through identical transformations in their respective reflectors, the signal at terminal 23 continues to lag behind the signal at terminal 22 by 90 degrees, and the signals both have equal amplitudes. The portion of the reflected signal going from terminal 23 to terminal 20 undergoes a second phase shift of 90 degrees so that it appears at terminal 20 with a total phase shift of 180 degrees from the signal appearing at terminal 20 from terminal 22. Since the two reflected signal portions appearing at terminal 20 are equal in amplitude and opposite in phase, they cancel each other completely and the input terminal 20 receives no reflected waves. The portion of the reflected signal conducted from terminal 22 to terminal 21 undergoes a phase shift of 90 degrees, placing it in phase with the portion of the signal conducted from terminal 23 to output terminal 21. The result is a reflected signal at terminal 21 which is proportional to the limited reflected signals appearing at terminals 22 and 23.

We claim as our invention:

1. A microwave power amplitude limiter reflecting means comprising:

(a) a waveguide section having one end open and the other end terminated by its characteristic impedance; and (b) a semiconductor limiter diode electrically and passively connected across said waveguide section in parallel orientation to the direction of the electric vector of the dominant transverse electric mode of said waveguide section, said semiconductor limiter diode having an apparent impedance at its point of connection in said waveguide section that varies inversely with the amplitude of incident microwave power.

2. A microwave power amplitude limiter reflecting means as recited in claim 1 further comprising: tuner means positioned an odd multiple of quarter wavelengths behind said semiconductor limiter diode in said waveguide section for compensating the reactances of said semiconductor limiter diode.

3. A microwave power amplitude limiter reflecting means as recited in claim 2 wherein said tuner means comprises a second semiconductor diode having substantially identical electrical characteristics as said semiconductor limiter diode and connected and oriented in said waveguide section in the same manner as said semiconductor limiter diode.

4. A microwave power amplitude limiter reflecting means as recited in claim 3 wherein said semiconductor limiter diode and said second semiconductor diode are of the point-contact, germanium type.

5. A microwave power amplitude limiter comprising:

(a) passive reflecting means having a reflection coefficient which varies inversely with the amplitude of incident microwave power for reflecting a portion of the incident microwave energy to be limited, the reflected microwave energy having a relatively constant power level, said passive reflecting means including:

(1) a waveguide section having one end terminated by the characteristic impedance of said waveguide section, and (2) a semiconductor limiter diode electrically and passively connected across said waveguide section in parallel orientation to the direction of the electric vector of the dominant transverse electric mode of said waveguide section; and (b) junction means connected to said waveguide section of said passive reflecting means for isolating microwave energy supplied to said passive reflecting means to be limited from microwave energy reflected by said passive reflecting means.

6. A microwave power amplitude limiter as recited in claim 5 further comprising: tuner means positioned an odd multiple of quarter wavelengths behind said semiconductor limiter diode in said waveguide section for compensating for the reactances of said semiconductor limiter diode.

7. A microwave power amplitude limiter as recited in claim 6 wherein said tuner means comprises: a second semiconductor diode having substantially identical electrical characteristics as said semiconductor limiter diode and connected and oriented in said waveguide section in the same manner as said semiconductor limiter diode.

8. A microwave power amplitude limiter as recited in claim 7 wherein said semiconductor limiter diode and said second semiconductor diode are of the point-contact, germanium type.

References Cited by the Examiner

UNITED STATES PATENTS

| | | | |
|---|---|---|---|
| 2,790,073 | 4/57 | Curtis | 333—24.2 |
| 2,920,292 | 1/60 | Scovil | 333—13 |
| 2,967,930 | 1/61 | Anderson | 325—449 |
| 2,979,677 | 4/61 | Clark | 333—35 |
| 2,999,173 | 9/61 | Ruck | 307—88.5 |
| 3,023,355 | 2/62 | Thorsen | 307—88.5 |
| 3,038,086 | 6/62 | Sterzer | 328—92 |
| 3,039,064 | 6/62 | Dain et al. | 307—88.5 |
| 3,041,543 | 6/62 | Papp | 333—22 |
| 3,058,070 | 10/62 | Reingold | 333—9 |
| 3,092,789 | 6/63 | Cremin | 333—1.1 |

HERMAN KARL SAALBACH, *Primary Examiner.*